(No Model.)
L. HILL.
FASTENING FOR CORSETS.
No. 315,031. Patented Apr. 7, 1885.
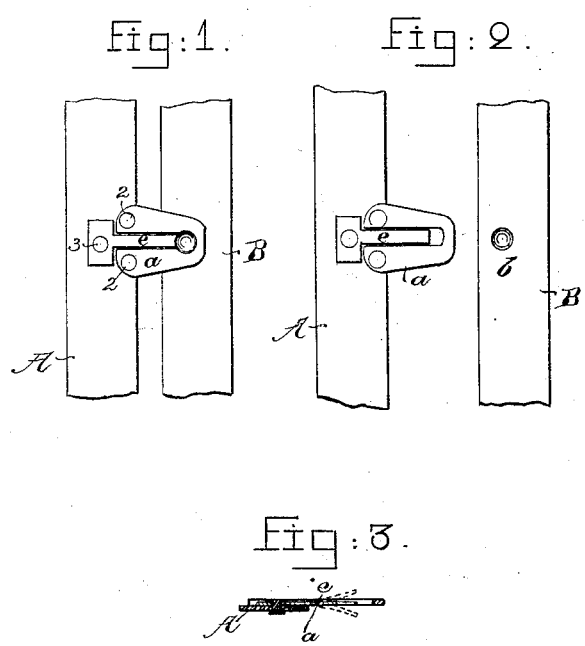
Witnesses.
Henry Marsh.
John F. C. Prinkirk.
Inventor.
Lucian Hill.
by Crosby & Gregory attys

UNITED STATES PATENT OFFICE.

LUCIAN HILL, OF NORTH BROOKFIELD, MASSACHUSETTS, ASSIGNOR TO THEODORE C. BATES, OF SAME PLACE.

FASTENING FOR CORSETS.

SPECIFICATION forming part of Letters Patent No. 315,031, dated April 7, 1885.

Application filed February 2, 1885. (No model.)

*To all whom it may concern:*

Be it known that I, LUCIAN HILL, of North Brookfield, county of Worcester, State of Massachusetts, have invented an Improvement in Fastenings for Corsets, of which the following description, in connection with the accompanying drawings, is a specification, like letters on the drawings representing like parts.

In this my invention a plate secured to a corset-steel is provided with a slot of sufficient width to permit the passage through it of a headed stud fastened to a second corset-steel, the said plate being provided with a spring-tongue whose free end projects into the said slot, so that when the stud is projected into the slot its head forces the free end of the spring out of the slot; but when the stud is well into the slot the head of the stud having passed the spring, the latter will assume its normal position in the slot to confine the stud therein, as will be hereinafter fully set forth, the said spring being free to be pushed or drawn from the said slot either up or down by the headed stud as it is made to enter or is withdrawn from the slot.

Figure 1 shows a pair of corset-steels with my improved fastening device attached, the headed stud being locked in the slotted plate. Fig. 2 shows the parts separated; and Fig. 3 is a longitudinal section of the plate, the dotted lines showing the spring-tongue in its extreme positions.

The part A of the corset-steel is provided with a plate, *a*, having a slot in which is located a spring-tongue, *e*, both the said plate and tongue, as herein shown, being riveted to the spring A by rivets 2 3.

The corset-steel B has a headed stud, *b*, connected with it, which is made to enter the slot in the said plate at the end of the said tongue, the said stud as it enters the said slot acting against the free end of the said tongue and pushing it aside.

The part of the slot at the end of the spring-tongue is of a length less than the diameter of the head of the stud *b*, so that the head of the stud displaces the tongue as the stud is pushed well into the slot, and the head of the stud having been pushed into the said slot beyond the end of the tongue, the latter quickly flies back into central position in the said slot, and serves to check and hold the stud in place and prevent the approach of the steels A B.

The stud is disengaged from the plate by moving the steels so that the head will press down upon the spring, thus forcing it downward until the head passes out of the slot and below the plate, when the spring will again resume its normal position.

I claim—

As an improvement in corset-steels, the part A, provided with a plate having a slot of a size to readily admit the entrance of a headed stud therein, and provided with a spring-tongue projecting into the said slot to confine the stud in the slot, the said spring-tongue being free to be moved out of the said slot from both sides of the said plate, as and for the purpose set forth.

In testimony whereof I have signed my name to this specification in the presence of two subscribing witnesses.

LUCIAN HILL.

Witnesses:
F. W. RUGGLES,
H. H. FAIRBANKS.